United States Patent
Kurokawa

(10) Patent No.: US 6,237,099 B1
(45) Date of Patent: *May 22, 2001

(54) ELECTRONIC DOCUMENT MANAGEMENT SYSTEM

(75) Inventor: Takeshi Kurokawa, Kanagawa (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,113

(22) Filed: Feb. 13, 1997

(30) Foreign Application Priority Data

Feb. 14, 1996 (JP) .................................................. 8-026492

(51) Int. Cl.[7] ...................................................... G06F 11/30
(52) U.S. Cl. ............................................... 713/200; 707/9
(58) Field of Search ............................. 395/186, 187.01, 395/188.01; 380/3, 4, 23, 25; 707/1, 8, 9; 340/825.31, 825.32; 713/200, 201, 202; 711/163

(56) References Cited

U.S. PATENT DOCUMENTS

| | | | | |
|---|---|---|---|---|
| 5,113,442 | * | 5/1992 | Moir | 380/25 |
| 5,144,556 | * | 9/1992 | Wang et al. | 707/9 |
| 5,163,147 | * | 11/1992 | Orita | 707/9 |
| 5,210,824 | * | 5/1993 | Putz et al. | 707/523 |
| 5,263,157 | * | 11/1993 | Jaris | 707/9 |
| 5,276,901 | * | 1/1994 | Howell et al. | 707/9 |
| 5,335,346 | * | 8/1994 | Fabbio | 711/163 |
| 5,446,903 | * | 8/1995 | Abraham et al. | 395/728 |
| 5,471,459 | * | 11/1995 | Gut | 340/825.34 |
| 5,560,008 | * | 9/1996 | Johnson et al. | 395/680 |
| 5,675,782 | * | 10/1997 | Montague et al. | 707/9 |
| 5,701,342 | * | 12/1997 | Anderson et al. | 380/4 |
| 5,765,152 | * | 6/1998 | Erickson | 707/9 |
| 5,845,067 | * | 12/1998 | Porter et al. | 713/200 |
| 5,903,720 | * | 5/1999 | Stokes | 709/9 |

FOREIGN PATENT DOCUMENTS

| | | |
|---|---|---|
| 7-191975 | 7/1995 | (JP) . |
| 7-239807 | 9/1995 | (JP) . |

* cited by examiner

*Primary Examiner*—Dieu-Minh T. Le
(74) *Attorney, Agent, or Firm*—Finnegan, Henderson, Farabow, Garrett & Dunner, L.L.P.

(57) ABSTRACT

An electronic document management system comprising access right list assignment unit for assigning an access right list setting an authorization system name, user name, and access right to an electronic document, access authorization unit for inquiring of an authorization system specified by a user who the user is when the electronic document is opened, and access right recognition means for recognizing the access right assigned to the authorized user from the access right list. To open an electronic document, the user is authorized in the authorization system specified by the user and the access right assigned to the authorized user is recognized from the access right list, then display and edit unit opens the electronic document in accordance with the recognized access right, whereby if the electronic documents confidential in each system are moved to another system, the access rights are also moved with the electronic documents, so that security of the electronic documents can be provided.

9 Claims, 7 Drawing Sheets

| AUTHORIZATION SYSTEM NAME | USER NAME | ACCESS RIGHT |
|---|---|---|
| UNIX | a a a | R, W |
| NETWARE | b b b | R |
| WINDOWS NT | c c c | R, W, P, A |
| LOCAL | d d d | R, W, P, A |

ELECTRONIC DOCUMENT MANAGEMENT SYSTEM

BACKGROUND OF THE INVENTION

This invention relates to an electronic document management system, and in particular to an electronic document management system that can control an access right to electronic documents covering different authorization systems.

In recent years, the prevalence of local area networks has made it possible for the users in different environments connected by networks to access each other. Normally, for electronic files (electronic documents) created in systems on the networks, an access right is set to allow reference to or update of the electronic file contents. For example, in a UNIX operating system (UNIX is a registered trademark in USA and other countries licensed by X/Open Company Ltd), which contains a UNIX file system, the access right to allow reference to or update of the electronic documents managed by the UNIX file system can be assigned to owners, groups to which the owners belong, and superusers (managers).

The operating systems such as UNIX, Windows NT (trademark of Microsoft Corporation USA), and NetWare (registered trademark of Novell Inc. USA) are available and electronic documents prepared by application software programs operating under the operating systems are distributed and copied everywhere via networks. For example, when an electronic document is copied or moved from one UNIX client computer to another, the information on the access right set in the electronic document is also copied or moved with the electronic document contents. For example, if one electronic document entered in a UNIX client computer is copied to a NetWare file server, of course, the electronic document contents are copied intact, but the access right information such as the content reference right and update right set in the UNIX client computer is not copied to the NetWare file server operating in a different manner from the UNIX operating system and the access right of the person who copies the electronic document is set.

Thus, in the network environment, the content reference right, update right, etc., of an electronic document can be set for each operating system, but the access right to the electronic document is granted in the file system of the operating system under which the electronic document is prepared.

Known as prior arts are a system wherein whether or not access is allowed is specified for each document and document field for providing security of the electronic documents (Japanese Patent Unexamined Publication No. Hei 7-191975), a document management system wherein fine reference authorization to each registered document can be granted in response to user's attributes (Japanese Patent Unexamined Publication No. Hei 7-239807), and the like.

The access right to electronic documents handled by conventional application software products (content reference right, update right, etc.,) is controlled in the file system proper to the operating system that can execute user management; it is controlled by each operating system which identifies (manages) the user accessing the electronic document. This means that the access right attendant on the electronic document can be controlled only if the electronic document exists in the file system and the user accessing the electronic document is recognized by the operating system. However, in an environment where computers in which different operating systems are installed exist on the network, if one electronic document in one file system is moved or copied to another file system in a different operating system, setting of the access right attendant on the source file system is not transferred to the move or copy destination file system, thus a security problem arises.

Since access right control is proper to each operating system, access right control to one electronic document could not be performed for an arbitrary user of an arbitrary operating system. For example, it would be impossible to perform content reference/update access right control to one electronic document for UNIX user A and access right control of only content reference for Windows NT user B.

SUMMARY OF THE INVENTION

It is therefore an object of the invention to provide an electronic document management system that can perform access right control to electronic documents or protect the electronic documents regardless of which file systems the electronic documents reside in, and moreover can assign an access right to one electronic document to any users of a plurality of operating systems that can execute user management.

An electronic document management system according to the invention is applied to an information processing system having at least one authorization system for checking the user for validity and authorizing the user if the user is valid and storage means for storing electronic documents. The electronic document management system comprises access right list assignment means for assigning an access right list setting an authorization system name, user name, and access type to an electronic document prepared by any application software product, compression and coding means for compressing or coding or compressing and coding an electronic document with an access right list as required, decompression and decoding means for decompressing or decoding or decompressing and decoding an electronic document stored on the storage means of one file system, access authorization means for inquiring of the authorization system specified by the user and gaining authorization of the user, access right recognition means for collating user information for authorization with a given access right list for recognizing the corresponding access type, display and edit means for performing electronic document processing in accordance with the recognized access type, and input means for accepting an access request to an electronic document stored in the storage means from the user. The input means is connected to the access right list assignment means and the access authorization means and is used by the user to set the authorization system name, user name, and access right in the access right list assignment means and specify the authorization system name, user name, and password in the access authorization means.

According to the electronic document management system of the configuration, when a prepared electronic document is stored in the storage means, the access right list assignment means assigns an access right list required for performing access right control to the prepared electronic document as one of document elements. The electronic document assigned the access right list is compressed and coded by the compression and coding means, then stored in the storage means. To access the electronic document stored in the storage means, first the electronic document is decompressed and decoded by the decompression and decoding means. Next, the access authorization means inquires of the authorization system who the user is, based on the user name and password specified by the user. If the user is authorized, the access right recognition means checks whether or not the access right list contains a pair corresponding to the authorization system name/user name pair. If the access right list contains the pair, the display and edit means opens the electronic document in accordance with the corresponding access type set in the access right list.

The access right list assignment means can set more than one user that can be managed by the operating system in the access right list to one electronic document. Thus, if an authorization system is added, it can also be added to the access right list. When an electronic document is stored, the contents of the electronic document can be compressed or coded. Thus, if the user is not authorized, he or she cannot reference the electronic document contents; security of the electronic document can be furthermore enhanced.

According to the invention, the access right to an electronic document allowed for any user of any operating system can be registered in the electronic document itself and when the user accesses the electronic document, the access authorization means inquires of the specified operating system if the user is to be authorized. Thus, access right control can be performed regardless of which operating system the electronic document resides in the file system of. Since the access right to the electronic document can be set in the electronic document for any user of any operating system, the user need not actually exist at the access right setting time and the access right can also be set for the user distant on the network. Therefore, the access right control intended by the person who prepares an electronic document at the document preparation time protects the electronic document contents regardless of which file systems the electronic document will be copied to in the future. Moreover, the electronic document management system handling the electronic documents does not manage the users, so that user management can be left to the external operating systems and the already existing network environment (user management environment) can be used as it is.

DETAILED DESCRIPTION OF THE INVENTION

Referring now to the accompanying drawings, there is shown a preferred embodiment of an electronic document management system of the invention applied to an electronic document processing system.

Figure 1:
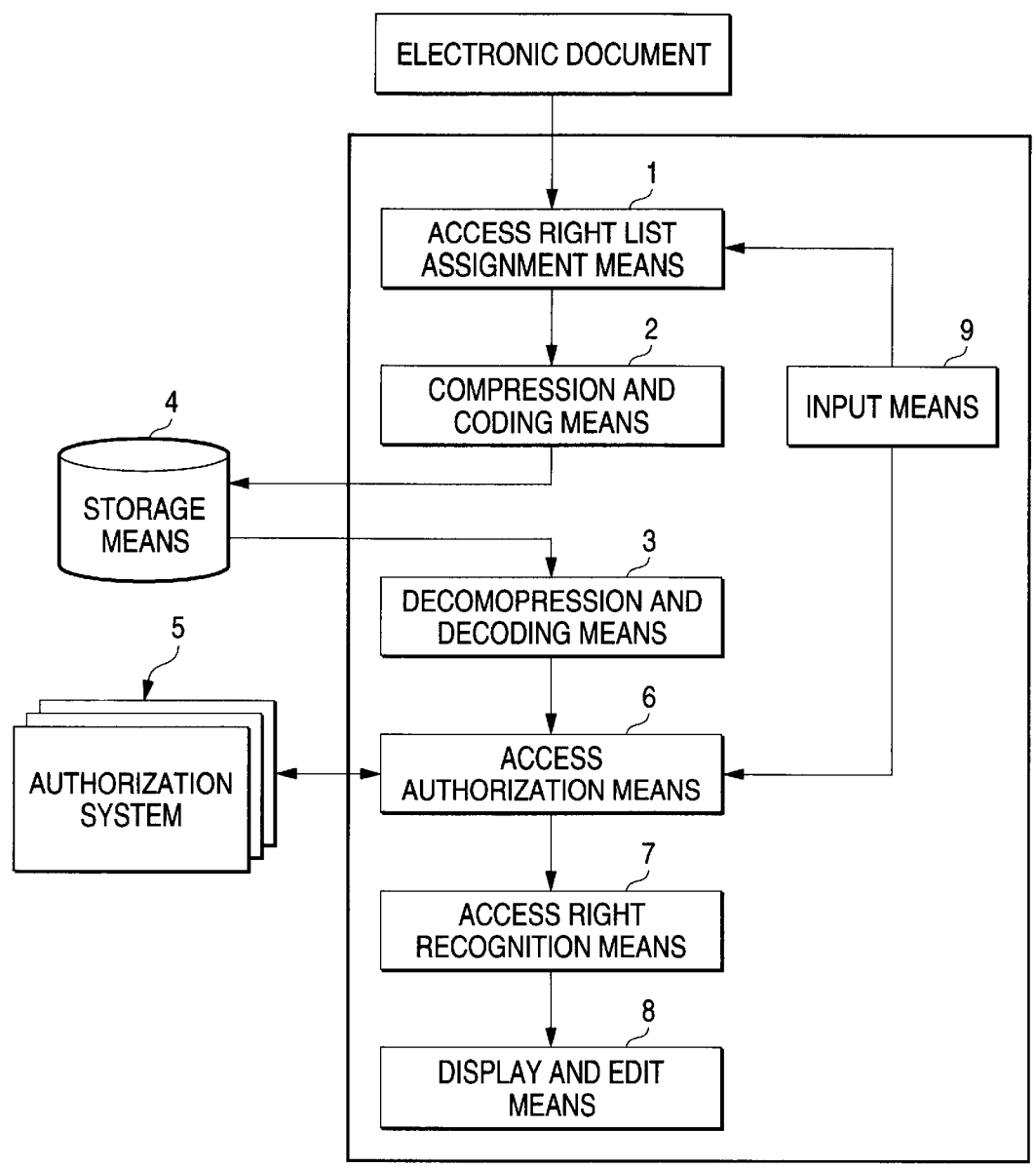
FIG. 1 is a block diagram to show a principle configuration of an electronic document management system according to the invention.
Figure 2:
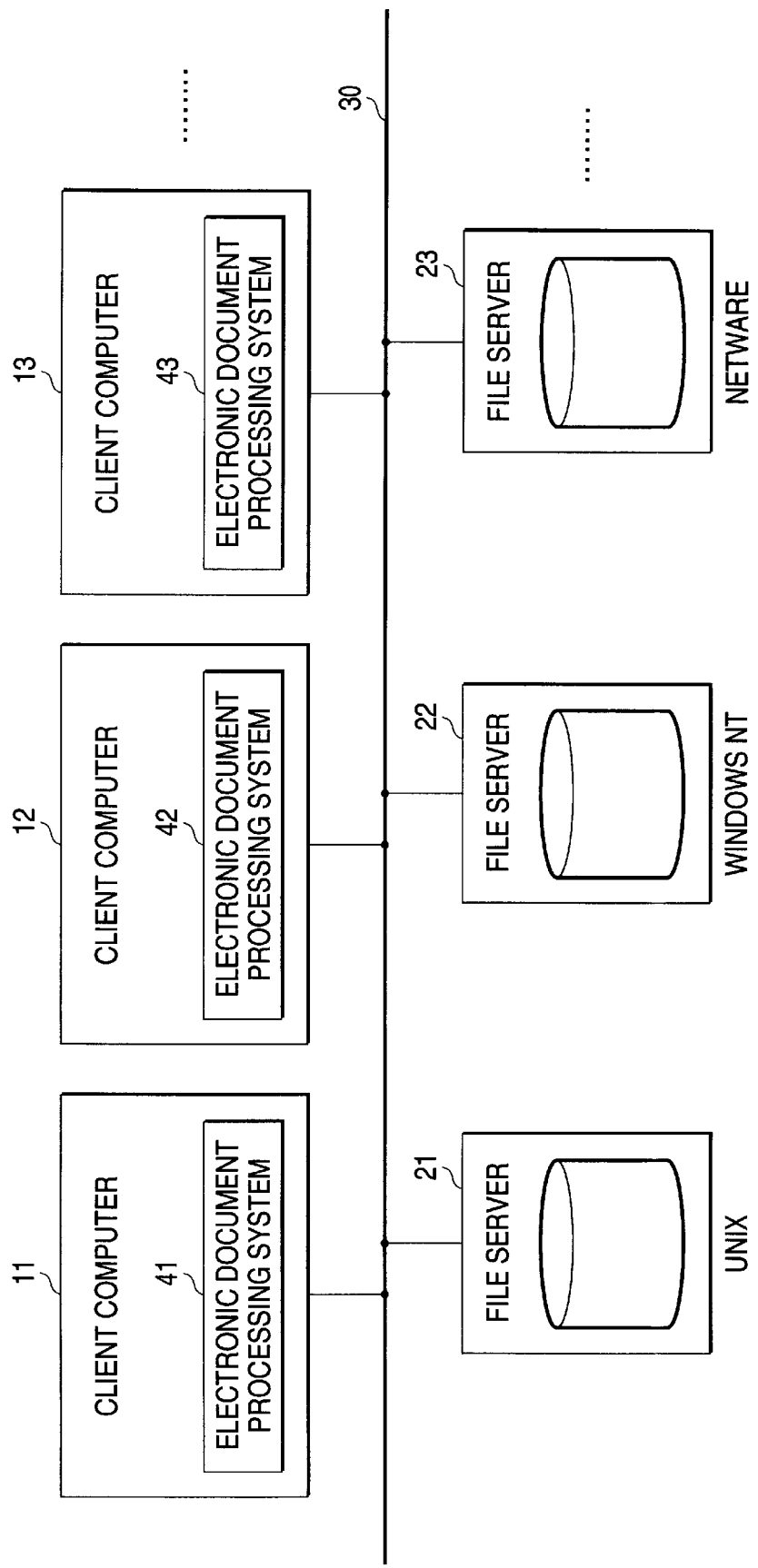
FIG. 2 is a block diagram to show electronic document processing systems in a network environment.

FIG. 2 is a block diagram to show electronic document processing systems in a network environment.

In the figure, a plurality of client computers 11, 12, 13, . . . and a plurality of file servers 21, 22, 23, . . . are connected by a network 30. Electronic document processing systems 41, 42, 43, . . . are installed in the client computers 11, 12, 13, . . . respectively. The file servers 21, 22, 23, . . . contain their own operating systems and file systems; for example, the file server 21 has a UNIX operating system, the file server 22 has a Windows NT operating system, and the file server 23 has a NetWare operating system. They have their respective authorization systems and file systems. If an access right is assigned, files in each file server 21, 22, 23, . . . can be copied, moved, etc., between the file servers from the client computer 11, 12, 13, . . .

Figure 3:
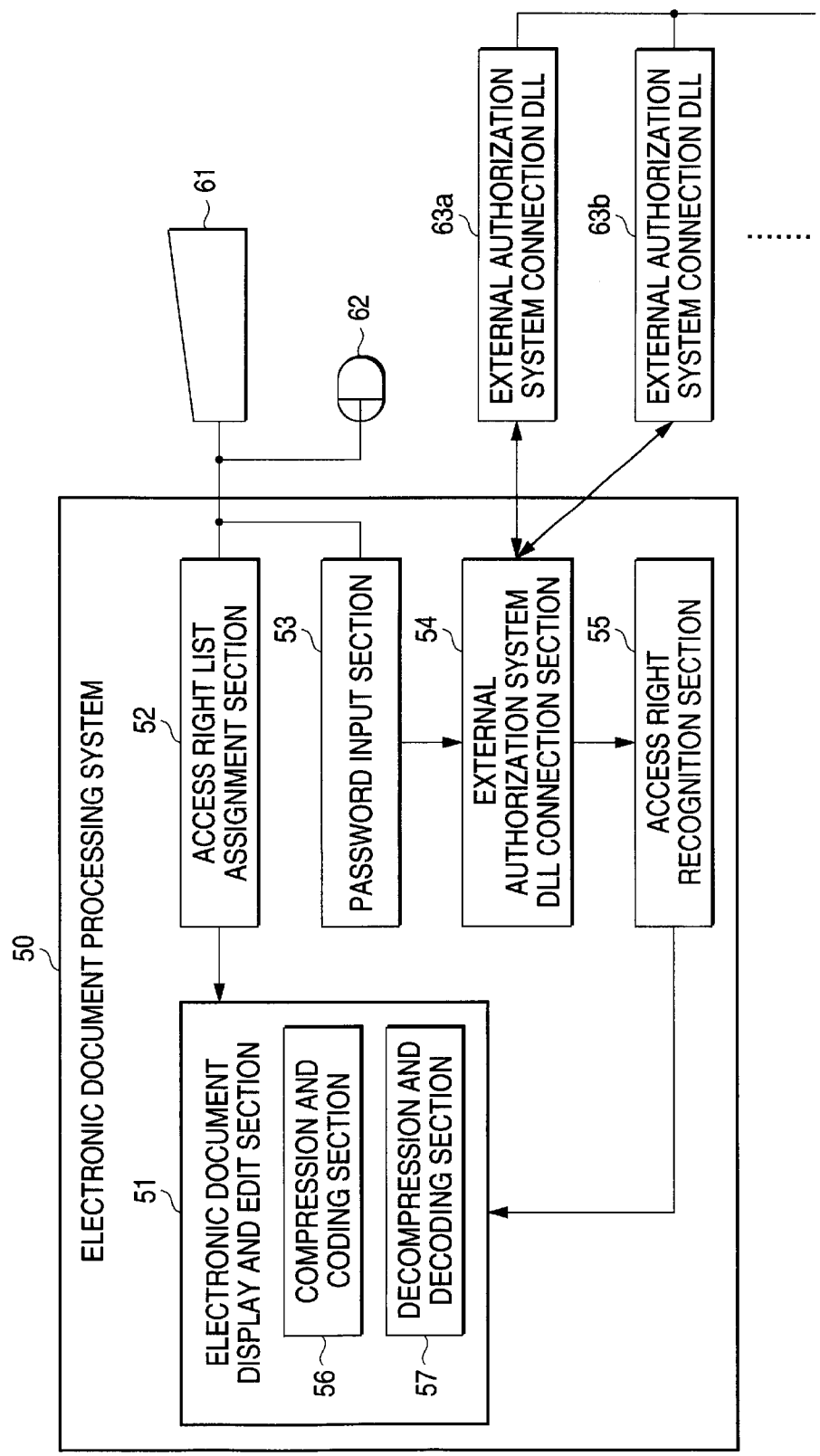
FIG. 3 is a block diagram to show the configuration of an electronic document processing system.

FIG. 3 is a block diagram to show the configuration of one of the electronic document processing systems.

An electronic document processing system 50 comprises an electronic document display and edit section 51 having a main function for displaying and editing electronic documents, an access right list assignment section 52 for assigning an access right list to a prepared electronic document, a password input section 53, an external authorization system DLL (Dynamic Link Library) connection section 54, and an access right recognition section 55. The electronic document display and edit section 51 comprises a compression and coding section 56 and a decompression and decoding section 57 for furthermore enhancing concealment of electronic documents. A keyboard 61 and a pointing device 62 such as a mouse are connected as input units to the access right list assignment section 52 and the password input section 53. A plurality of external authorization system connection DLLs 63a, 63b, . . . for actual connection to external authorization systems are connected to the external authorization system DLL connection section 54, the external authorization system connection DLLs 63a, 63b, . . . being provided in a one-to-one correspondence with the external authorization systems.

The electronic document display and edit section 51 can adopt a document processing system described in Japanese Patent Application No. Hei 7-117733, for example. That is, the document processing system is a system for hierarchically overlaying electronic document elements (objects such as text, figures, tables, and graphics) as if documents of paper media were pasted for preparing a compound document and enabling the prepared compound document to be electronically handled like a paper document. Therefore, an access right list assigned to an electronic document by the access right list assignment section 52 (described later) is handled by the system as one of such hierarchically overlaid document elements).

The access right list assignment section 52 assigns or deletes entries to or from the access right list to an electronic document. The password input section 53 enables the user to enter information required for authorization. The external authorization system DLL connection section 54 connects to external authorization system connection DLLs 63a, 63b, . . . for checking to see if authorization is valid. As many DLLs as desired can be increased or decreased. If valid authorization is gained, the access right recognition section 55 collates a given access right list with the authorized user for determining the electronic document access right.

Figures 4, 5:
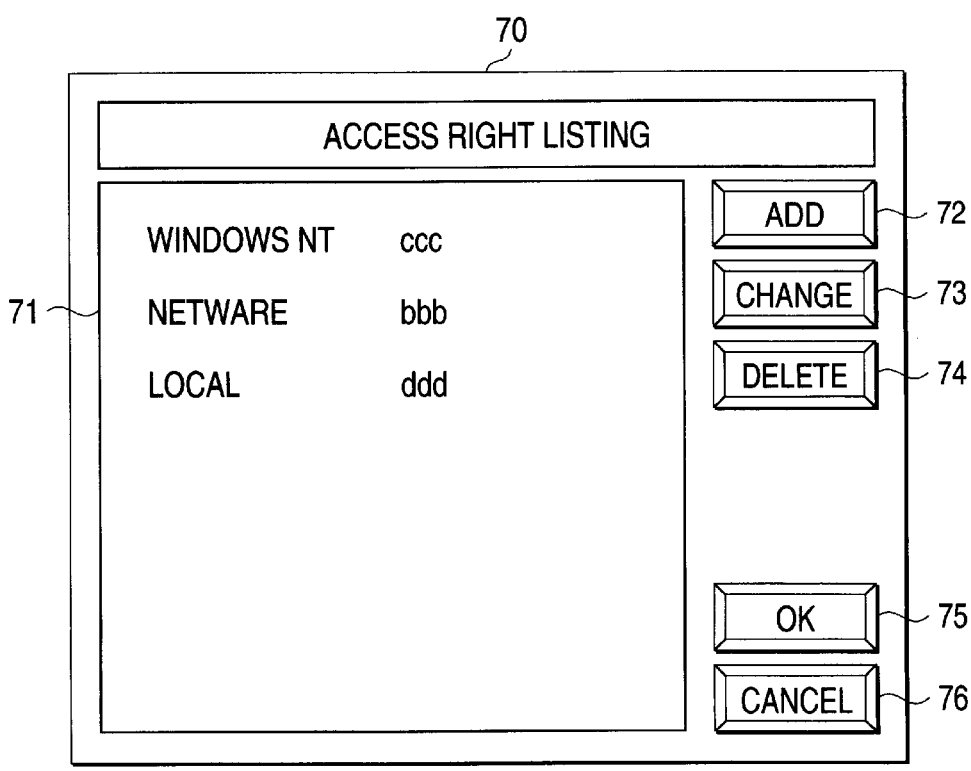
FIG. 4 is an illustration to show the format of an access right list.
FIG. 5 is an illustration to show an example of an access right listing dialog.

Each electronic document can have a list of users and access rights for controlling the access right. The list is called an access right list. The concept of the access right list is described below:

FIG. 4 is an illustration to show the format of the access right list.

In the figure, the access right list consists of a set of three columns of authorization system name, user name, and access right. Users of any authorization systems can be selected for the users. The authorization system is an external system and normally an operating system that can execute user management, such as UNIX, Windows NT, or NetWare. To use the authorization systems, their corresponding external authorization system connection DLLs 63a, 63b, . . . are required. The authorization system DLLs are not fixed and can be easily added or deleted conforming to the network environment of the electronic document processing system.

The user name refers to a user name of the corresponding system. Any character strings registered in the authorization systems or a wild card (an asterisk * (half-size character) representing all users) can be used for the user names. The character strings of the user names are case-independent in authorization.

The access right includes content reference right (R), content update right (W), attribute change right (P), and right change right (A) corresponding to four access types.

Figure 6:
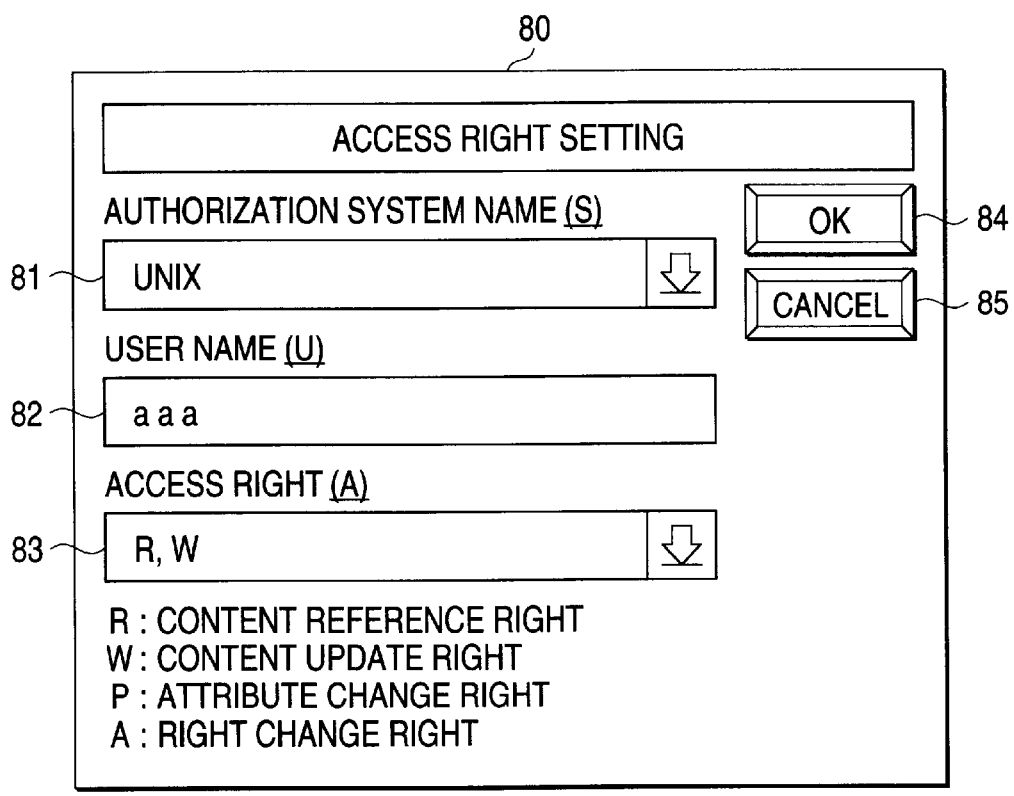
FIG. 6 is an illustration to show an example of an access right setting dialog.

The authorization system name, user name, and access right on the access right list are assigned arbitrary values through a dialog. Examples of the dialogs displayed on a screen when the access right is set are given below:

FIG. 5 is an illustration to show an example of an access right listing dialog. FIG. 6 is an illustration to show an example of an access right setting dialog.

To prepare an access right list, first an access right listing dialog 70 is displayed. This access right listing dialog 70 has a display box 71 for displaying an access right list already registered for one electronic document, an ADD button 72 used to add access right to the displayed access right list, a CHANGE button 73 used to change the registered access right, a DELETE button 74 used to delete the registered access right, an OK button 75 used to quit, and a CANCEL button used to cancel. Thus, the user can add, change, and delete the access right through the access right listing dialog 70 as he or she desired.

Here, if the ADD button 72 is pressed or the CHANGE button 73 is pressed with an access right entry selected out of the list, an access right setting dialog shown in FIG. 6 is displayed on the screen. This access right setting dialog 80 has a text box 81 for entering an authorization system name, a text box 82 for entering a user name, a text box 83 for entering access right, an OK button 84, and a CANCEL button 85.

For example, if the user presses the ADD button 72 on the access right listing dialog 70, the access right setting dialog 80 is displayed with the text boxes 81, 82, and 83 as blanks. When the user makes entries in the boxes and then presses the OK button 84, the entered access right is added to the display box 71 of the access right listing dialog 70. The authorization names and access rights may be assigned default values, in which case the user can also select any default value out of a list in the combo box to enter the authorization name or access right in the text box 81 or 83.

Next, a flow of the operation of the electronic document processing system 50 for opening an electronic document with an access right list will be discussed.

Figure 7:
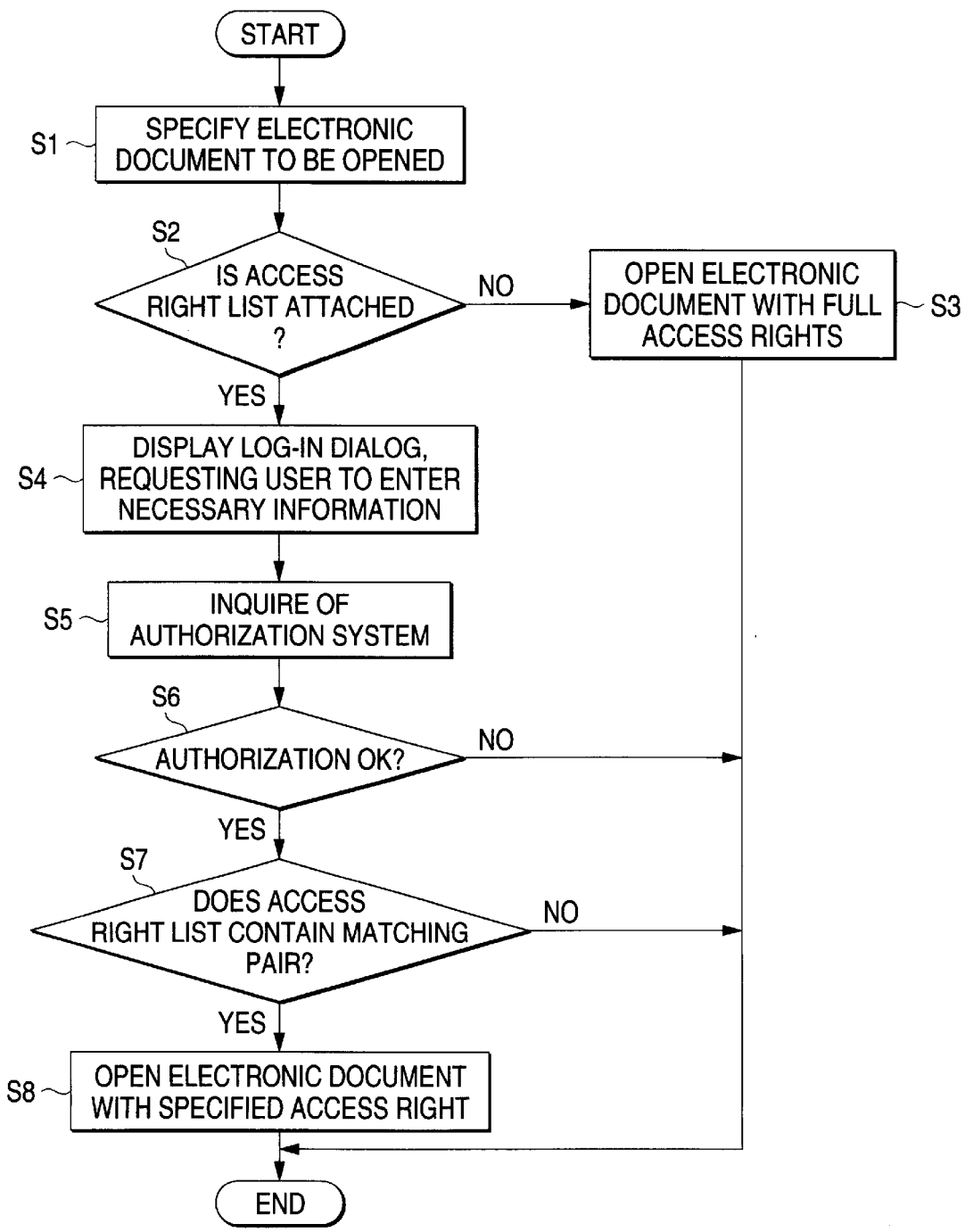
FIG. 7 is a flowchart to show a flow of the operation when an electronic document is opened.

FIG. 7 is a flowchart to show a flow of the operation when an electronic document is opened.

To open an electronic document, first the user specifies the electronic document to open at step S1. Next, whether or not an access right list is attached to the specified electronic document is checked at step S2. If no access right list is attached, the electronic document is opened with full access rights (contents reference right, content update right, attribute change right, and right change right) at step S3. If an access right list is attached to the specified electronic document, the electronic document processing system 50 displays a log-in dialog (described later) to request the user to enter the authorization system name, user name, and password at step S4. The electronic document processing system 50 calls the external authorization system connection DLL to inquire of the corresponding authorization system through the external authorization system DLL connection section 54 based on the entered information, and inquires the entered values of the authorization system at step S5. The inquiry result is judged at step S6. If the user is not authorized to open the electronic document, the electronic document is not opened and the process is terminated. If the entered values are valid, the electronic document processing system 50 checks whether or not the access right list to the electronic document to be opened contains a pair of the authorization system name and the user name at step S7. If the access right list contains a pair matching the authorization system name/user name pair, the electronic document is opened on the electronic document display and edit section 51 of the electronic document processing system 50 with the access right corresponding to the authorization system name/user name pair at step S8. If the access right list does not contain a pair matching the authorization system name/user name pair, the electronic document is not opened and the process is terminated.

Figure 8:
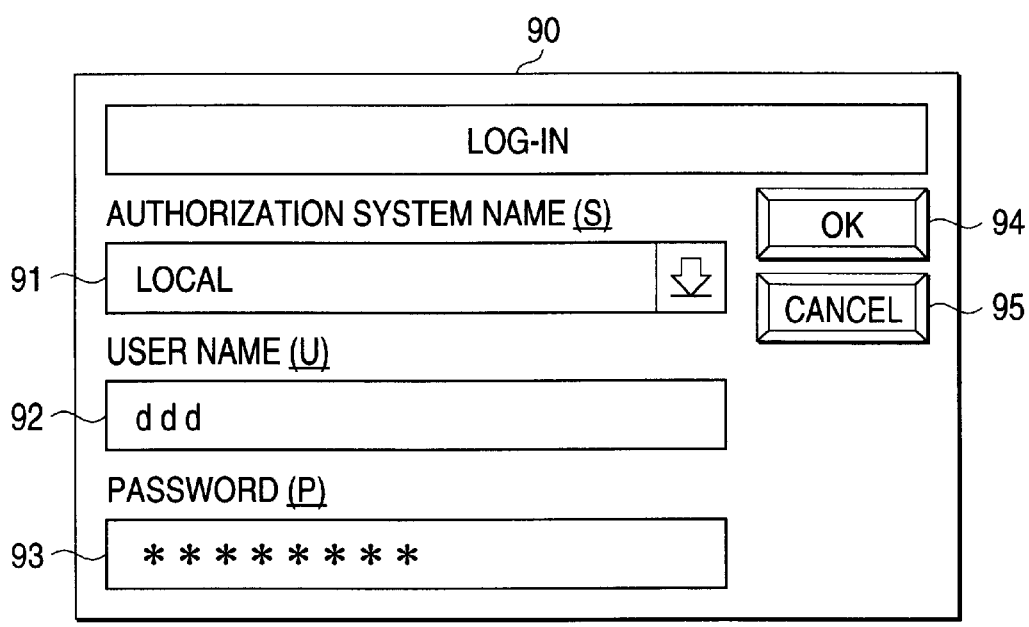
FIG. 8 is an illustration to show an example of a log-in dialog.

FIG. 8 is an illustration to show an example of a log-in dialog.

The password input section 53 displays a log-in dialog 90 at step S4 (FIG. 7) in the operation flow for opening an electronic document. This log-in dialog 90 has a text box 91 for entering an authorization system name, a text box 92 for entering a user name, a text box 93 for entering a password, an OK button 94, and a CANCEL button 95. When the user enters authorization system name, user name, and password and presses the OK button 94, control goes to step S5 in FIG. 7 at which the electronic document processing system 50 inquires of the authorization system if the entered password is valid.

According to the embodiment, an access list is added to an electronic document, so that the access right intended by the person who prepares the electronic document (on the access right list added at the electronic document preparation time) is protected regardless of what the access right in the file system storing the electronic document (for example, UNIX) is, namely, which file system the electronic document resides.

Further, the authorization system is not fixed and the DLL required for connection to the authorization system can be easily added to or deleted from the electronic document management system, thus any desired authorization system can be used and the security function of the electronic document management system can be made flexible.

As we have discussed, the access right to one electronic document allowed for any user of any operating system can be assigned to the electronic document itself. The user who accesses the electronic document (file) is authorized by inquiring of the specified operating system if the user is to be authorized at the access time, whereby access right control to the electronic document can be performed regardless of which operating system the electronic document resides in the file system of. Since the access right to the electronic document can be set in the electronic document for any user of any operating system, it can also be set for the user distant on the network. For example, if the electronic document is sent through a medium such as a floppy disk to which the access right cannot be assigned, only the system and the user set in the access right list assigned to the electronic document can open the electronic document, so that the access right can also be set for the users not existing on the network. Therefore, the access right control intended by the person who prepares the electronic document at the document preparation time protects the electronic document contents regardless of which file systems the electronic document will be copied to in the future. Further, the electronic document management system handling the electronic documents does not manage the users, so that user management can be left to the external operating systems and the already existing network environment (user management environment) can be used.

What is claimed is:

1. An electronic document management system for an information processing system having at least one authorization system for checking a user for validity and authorizing the user if the user is valid and means for storing electronic documents, the electronic document management system comprising:

access right list assignment means for assigning an access right list to an electronic document, the access right list comprising information for identifying a user authorized to access the electronic document and information for identifying an authorization system corresponding to the authorized user so as to control access to the electronic document when the document is copied or moved to a different type authorization system;

input means for accepting an access request from a user requesting access to at least one electronic document stored in the electronic document storage means;

access authorization means for determining which of the authorization systems to request authorization for the user requesting access and gaining authorization from the determined authorization system;

access right recognition means for checking the access right list assigned to the electronic document requested to be accessed to determine whether the user authorized by the authorization system has access to the electronic document requested to be accessed and determining whether the access to the electronic document is allowed or denied based on a result of the checking; and means for performing processing responsive to the entered access request only if the access is determined to be allowed by said access right recognition means.

2. The electronic document management system as claimed in claim 1, further including means for compressing the electronic document to which the access right list is assigned and means for decompressing compressed electronic documents stored in the electronic document storage means.

3. The electronic document management system as claimed in claim 1, further including means for coding the electronic document to which the access right list is assigned and means for decoding coded electronic documents stored in the electronic document storage means.

4. The electronic document management system as claimed in claim 1, further including means for compressing and coding the electronic document to which the access right list is assigned and means for decompressing and decoding compressed and coded electronic documents stored in the electronic document storage means.

5. An electronic document management system for an information processing system having at least one authorization system for checking a user for validity and authorizing the user if the user is valid and means for storing electronic documents, said electronic document management system comprising:

access right list assignment means for assigning an access right list to an electronic document, the access right list comprising information for identifying a user authorized to access the electronic document and information for specifying an access type assigned to the user and information for identifying an authorization system corresponding to the authorized user so as to control access to the electronic document when the document is copied or moved to a different type authorization system;

input means for accepting an access request from a user requesting access to at least one electronic document stored in the electronic document storage means;

access authorization means for determining which of the authorization systems to request authorization for the user requesting access and gaining authorization from the determined authorization system;

access right recognition means for checking the access right list assigned to the electronic document requested to be accessed to determine whether the user authorized by the authorization system has access to the electronic document requested to be accessed and determining whether the access to the electronic document is allowed or denied based on a result of the checking; and means for determining the access type of the access right list and performing processing responsive to the entered access request only if the access is determined to be allowed by said access right recognition means.

6. The electronic document management system as claimed in claim 5, wherein the access type includes a document content reference right, a document content update right, a document attribute change right, and a document right change right.

7. An electronic document management system for an information processing system having at least one authorization system for checking a user for validity and authorizing the user if the user is valid and means for storing electronic documents each with an access right list comprising information for identifying a user authorized to access the electronic document and information for identifying an authorization system corresponding to the authorized user so as to control access to the electronic document when the document is copied or moved to a different type authorization system, said electronic document management system comprising:

input means for accepting an access request from a user requesting access to at least one electronic document stored in the electronic document storage means;

access authorization means for determining which of the authorization systems to request authorization for the user requesting access and gaining authorization from the determined authorization system;

access right recognition means for checking the access right list assigned to the electronic document requested to be accessed to determine whether the user authorized by the authorization system has access to the electronic document requested to be accessed and determining whether the access to the electronic document is allowed or denied based on a result of the checking; and means for performing processing responsive to the entered access request only if the access is determined to be allowed by said access right recognition means.

8. An electronic document management system for an information processing system having at least one authorization system for checking a user for validity and authorizing the user if the user is valid and means for storing electronic documents each with an access right list comprising information for identifying a user authorized to access the electronic document and information for specifying an access type assigned to the user and information for identifying an authorization system corresponding to the authorized user so as to control access to the electronic document when the document is copied or moved to a different type authorization system, said electronic document management system comprising:

input means for accepting an access request from a user requesting access to at least one electronic document stored in the electronic document storage means;

access authorization means for determining which of the authorization systems to request authorization for the user requesting access and gaining authorization from the determined authorization system;

access right recognition means for checking the access right list assigned to the electronic document requested to be to determine whether the user authorized by the authorization system has access to the electronic document requested to be accessed and determining whether the access to the electronic document is allowed or denied based on a result of the checking; and means for setting the access type on the access right list and performing processing responsive to the entered access request only if the access is determined to be allowed by said access right recognition means.

9. A method for controlling an access right to an electronic document wherein the access right covers different authorization systems, comprising the step of:

(a) assigning an access right list to the electronic document wherein the access right list comprises information for identifying a user authorized to access the electronic document and information for identifying an authorization system corresponding to the user so as to control access to the electronic document when the document is copied or moved to a different type authorization system;

(b) obtaining an input authorization system name, a user name, and a password from a user requesting access to the electronic document;

(c) obtaining authorization from the authorization system corresponding to the input authorization system name;

(d) checking the access list to determine if the access list contains information for identifying the user name and corresponding information for identifying the input authorization system name;

(e) allowing or denying access to the document based on the result of the step of checking.

* * * * *

UNITED STATES PATENT AND TRADEMARK OFFICE
CERTIFICATE OF CORRECTION

PATENT NO.     : 6,237,099 B1
DATED          : May 22, 2001
INVENTOR(S)    : Takeshi Kurokawa It is certified that error appears in the above-identified patent and that said Letters Patent is hereby corrected as shown below:

Column 9,
Lines 22-23, after "requested to be", insert -- accessed --.

Signed and Sealed this

Second Day of July, 2002

Attest:

Attesting Officer

JAMES E. ROGAN
Director of the United States Patent and Trademark Office